United States Patent [19]

Knapp

[11] Patent Number: 5,044,648
[45] Date of Patent: Sep. 3, 1991

[54] BICYCLE SUSPENSION SYSTEM

[76] Inventor: Thomas D. Knapp, 1081 Graham Rd., Kent, Ohio 44240

[21] Appl. No.: 340,088

[22] Filed: Apr. 18, 1989

[51] Int. Cl.$^5$ .................. B62K 19/36; B62K 21/20; F16F 9/36; F16F 11/00
[52] U.S. Cl. .................. 280/283; 188/322.17; 248/622; 248/631; 267/221; 267/226; 280/276
[58] Field of Search .............. 280/283, 275, 276, 277, 280/279, 280, 274; 188/322.17, 322.16; 248/622, 631; 267/217, 221, 226

[56] References Cited

U.S. PATENT DOCUMENTS

| 575,152 | 1/1897 | Fogg | 280/283 |
|---|---|---|---|
| 601,978 | 4/1898 | Nevill | 280/283 |
| 602,354 | 4/1898 | Ohlgart | 280/276 X |
| 636,726 | 11/1899 | Hindmarsh | 280/283 |
| 658,909 | 10/1900 | Fraser | 280/283 |
| 979,483 | 12/1910 | Harley | 280/283 |
| 1,605,798 | 11/1926 | Van Crombrugge | 267/226 |
| 3,208,767 | 9/1965 | Moulton | 280/276 |
| 3,891,236 | 6/1975 | Kuwano et al. | 280/283 |
| 3,912,054 | 10/1975 | Fabre et al. | 280/276 X |
| 3,931,990 | 1/1976 | Knapp | 280/283 |
| 3,982,770 | 9/1976 | Satoh et al. | 280/283 X |
| 3,989,263 | 11/1976 | Stuck et al. | 280/283 |
| 4,182,508 | 1/1980 | Kallai et al. | 297/209 |
| 4,421,337 | 12/1983 | Pratt | 280/277 |
| 4,576,393 | 3/1986 | Moulton et al. | 280/276 |
| 4,582,343 | 4/1986 | Waugh | 280/284 |
| 4,679,811 | 7/1987 | Shuler | 280/284 |
| 4,736,983 | 4/1988 | Furbee | 297/209 |

FOREIGN PATENT DOCUMENTS

| 421323 | 5/1947 | Italy | 280/283 |
|---|---|---|---|
| 482796 | 7/1953 | Italy | 280/276 |
| 535509 | 11/1955 | Italy | 280/276 |

Primary Examiner—Mitchell J. Hill
Attorney, Agent, or Firm—Oldham & Oldham

[57] ABSTRACT

The invention comprises a suspension system for a bicycle or similar vehicle to allow shock isolation at the location of the seat or handle bar mounting or other locations. The suspension system as well as a variable rate progressive dampening assembly. The hydraulic fluid is also utilized to lubricate the moving portions of the system to promote proper function and extend the useful life thereof. The system also has a variable spring preload to accommodate different sized riders. The system is cost effective and yet extremely durable and may be retrofit for use with existing bicycles.

28 Claims, 8 Drawing Sheets

BICYCLE SUSPENSION SYSTEM

BACKGROUND OF THE INVENTION

This invention relates to a suspension system for a bicycle or the like to improve the riding comfort thereof. More particularly, the invention relates to a shock absorbing system for use at the seat or other location on a bicycle to form a suspension system to dampen shocks incurred during riding thereof.

The comfort of the ride on bicycles or other similar vehicles has escalated in importance as the popularity and use of such vehicles has expanded. For example, bicycles are now manufactured which are known as mountain bikes or ATB's (All Terrain Bicycle) which are constructed to be used in off-road environments. In these particular situations, the comfort of the ride is particularly important. The comfort is also important with road use of bicycles as the length of the ride is usually significantly longer.

A variety of suspension systems have been developed for bicycles or the like. These include shock absorbing means coupled with the frame of the bicycle and to the wheels thereof so as to absorb shocks imposed on the wheels during riding. A few examples of such systems are shown in U.S. Pat. Nos. 4,576,393 and 4,421,337. These systems provide relative movement between the wheels and the frame of the bicycle, and necessarily include toggle links or other hinge means to allow pivotal motion at the location where the wheels are secured to the frame of the bicycle.

A similar system is shown in U.S. Pat. No. 4,582,343, wherein a rear-wheel suspension system includes a shock absorber, having its outer housing incorporated as a structural element of the frame of the bicycle and connected to a linkage system to allow relative movement of the rear wheel. This system also incorporates a rider-controlled valve for hydraulically locking and unlocking the shock absorber to engage the suspension system when desired by the rider.

There are also known bicycle suspension systems having a shock absorbing means forming part of the frame of the bicycle. One system, in U.S. Pat. No. 4,679,811, shows a shock absorber mounted in a tube of the frame of the bicycle which has its piston connected to a separate rear frame or swing-arm wheel mount for the rear wheel. This system also comprises an actuating cable coupled with the shock absorber of the system to lock the shock absorber and prevent the suspension action thereof when desired.

Similarly, the front wheels of the bicycle have also been provided with a suspension system such as shown in U.S. Pat. No. 3,208,767, wherein coacting splined tubular members are slidably engaged to allow vertical movement of the wheel to which the suspension is connected but to prevent relative rotation of the tubular members.

Some proposed systems to isolate shocks imposed on bicycles and similar vehicles have included the mounting of coil springs onto the bottom of the seat on which the rider rests or to the seat frame to cushion shock to some degree. Other systems provide relative movement between the seat of the bicycle on which the rider will be supported and the frame of the bicycle, to thereby absorb shocks imposed on the bicycle and to provide a smoother ride. One proposal uses spring posts with external springs and key slots designed to dampen the jarring of a bicycle frame and seat as shown in U.S. Pat. No. 4,736,983. The coil spring in this invention is received on a post to which the seat of the bicycle may be mounted and the whole assembly is prevented against rotation to maintain the seat in alignment during riding of the bicycle.

In this type of system, a shock absorbing mechanism is exposed to the atmosphere and is, therefore, subject to corrosion which will limit the life expectancy and functioning of the apparatus. Similarly, the key slot provided to prevent rotation of the post to which the seat is attached is also exposed to the environment and may gather dirt or other debris, thereby inhibiting relative movement of the outer sleeve. It is also seen that the device has no means by which the rider can vary the amount of dampening provided by the system and will not be effective over a wide range of riders which may utilize the system and over a broad range of road or off-road conditions.

In another system, as shown in U.S. Pat. No. 4,182,508, a post to which the seat is mounted which is slidable telescopically within another fixed post, acted on by a spring to act as a shock absorber. This system includes an optional locking of the two posts together to eliminate the cushioning effect afforded thereby and fully encloses the spring mechanism to prevent corrosion and malfunctioning. This system also includes a slot provided on an inner tubular member in which an inwardly protruding key formation on an outer tubular member is disposed to prevent relative rotation between the tubular members. This system again shows a non-rotation, free spring seat post with no hydraulic dampening or lubrication of the sliding mechanisms to extend the useful life and function of the system.

Another known shock absorber is shown in U.S. Pat. No. 3,891,236, again showing a shock absorber to act as a support for the seat of the bicycle. In this system, a shock absorber includes an oil cylinder which is filled slidably but nonrotatably in an outer tubular member. The oil cylinder rests on a spring and a piston extends therein to provide a dampening action in the system. The absorber utilizes polygonal shaped tubular members to prevent relative rotation therebetween, with a separate dampening chamber as described. The polygonal slide tubes are separate from the oil chamber and receive no lubrication during use. A spring rate is variable by changing the distance of the dampening chamber to the lower spring chamber which reduces the distance of travel of the seat directly. Therefore, the heavier rider must increase the spring rate as needed and, in doing so, will lose seat movement which may be important under some conditions.

It is seen that prior art systems provide different suspension system designs, some of which include relatively complex toggle systems to yield relative movement between the wheels of the bicycle and the frame. These systems must be incorporated into the manufacture of the bicycle and cannot be utilized with existing bicycles not having a suspension system.

Other suspension systems have included shock absorbing means which may be incorporated into an existing bicycle. These designs have included telescopically slidable members which are prevented against rotation relative to one another and which are non-lubricated and may be exposed to atmospheric conditions. Some systems have not been adjustable while others include adjustment of the preload on a spring mechanism to accommodate heavier loads. Unfortunately, the adjustment of the preload on the spring also reduces the travel distance of the seat or other portion of the bicycle and thereby inhibits use of the system under some circumstances.

SUMMARY OF THE INVENTION

Based upon the disadvantages found in the prior art, it is accordingly a main object of this invention to provide a bicycle suspension system which may be incorporated or retrofit into an existing bicycle for the mounting of the seat, handlebars or the like so as to efficiently isolate shocks imposed on the bicycle.

It is another object of the invention to provide a device which is of compact and lightweight design to be utilized with the modern mountain and city bicycles to provide a compatible, quality accessory to enhance the comfort and versatility of these bicycles.

It is yet another object of the invention to provide a suspension device which is totally enclosed, having only one external moving post attached directly to a seat, handlebars, or other location to provide the suspension thereto. In this way, the suspension system will be prevented from exposure to atmospheric conditions thereby extending the useful and functional life of the system.

Another object of the invention is to provide direct lubrication to the movable portions of the suspension system to reduce wear and binding of these portions for proper and extended functioning thereof.

A further object of the invention is to provide a dampening function to yield a smooth and comfortable ride on road or off-road surfaces which will be effective in both pedaling and coasting modes of riding.

It is yet another object of the invention to provide control of the resiliency of a spring means associated with the suspension system without diminishing the travel associated with the suspension system to thereby be adjustable for a broad range of riders and maintain equivalent operating characteristics.

It is a further object of the invention to provide a suspension system wherein the system is designed to be a non-rotation system, thereby affording a range of movement in one directional plane only. Alternatively, the design is adjustable to provide limited additional movement in a second directional plane to thereby gain additional advantages which may be desirable in some circumstances.

These and other objects of the invention are accomplished by a suspension system which includes a variable rate spring along with a varying rate hydraulic dampening cylinder design to effectively isolate the shock imposed on the wheels or frame of a bicycle. The suspension system may be mounted in conjunction with the frame of a bicycle to provide a suspended non-rotation or limited rotation mounting structure for a seat, handlebars or other portion of the bicycle or other vehicle. The suspension system can be adapted to many types of vehicles such as unicycles, bicycles, tricycles or the like, with conventional tube and clamp arrangements.

In a preferred embodiment, the suspension system comprises an outer tubular housing member having disposed therein an inner tubular guide member having guide means located therein which coact with guide means provided on a piston rod disposed on the interior of the tubular housing member and extending outwardly therefrom. The outwardly extending piston rod may serve as the mounting structure for a bicycle seat or the like and is capable of telescopically slidable movement within the outer tubular housing member to provide effective shock isolation at the location of the seat or other structure. Also, the suspension system may be utilized with a sub-frame and toggle link assembly for relative movement of a wheel of a bicycle or the like.

The guide means provided in the tubular guide member and piston rod, house bearing means therein to permit telescopically slidable movement between the piston rod and the tubular guide member to give the suspension action. A spring member is disposed on the interior of the outer tubular housing below a piston rod means to provide a biasing force against the piston rod in the suspension system. A pre-load adjuster is positioned relative to the spring means to provide a variable rate spring assembly for adjustment of the suspension action to accommodate a wide range of riders and terrain. A hydraulic fluid is disposed within the spring chamber and a dampening valve is included in the piston rod so as to provide a varying rate hydraulic dampening assembly which also acts to provide lubricant to the bearing means acting in association with the piston rod to ensure proper functioning of the suspension system and to increase the useful life thereof.

The suspension system of the invention provides a device to enhance rider comfort and safety in bicycles and other vehicles in all types of riding situations. The system transfers the side loads imposed on the seat or other portions of the bike to the bearing guides to accommodate these loads. The suspension system provides a very cost effective and yet extremely durable device.

BRIEF DESCRIPTION OF THE DRAWINGS

These and other features, objects, uses, and advantages of the invention become apparent from reading of the detailed description with reference to the accompanying drawings wherein.

DETAILED DESCRIPTION OF THE INVENTION

Figure 1:
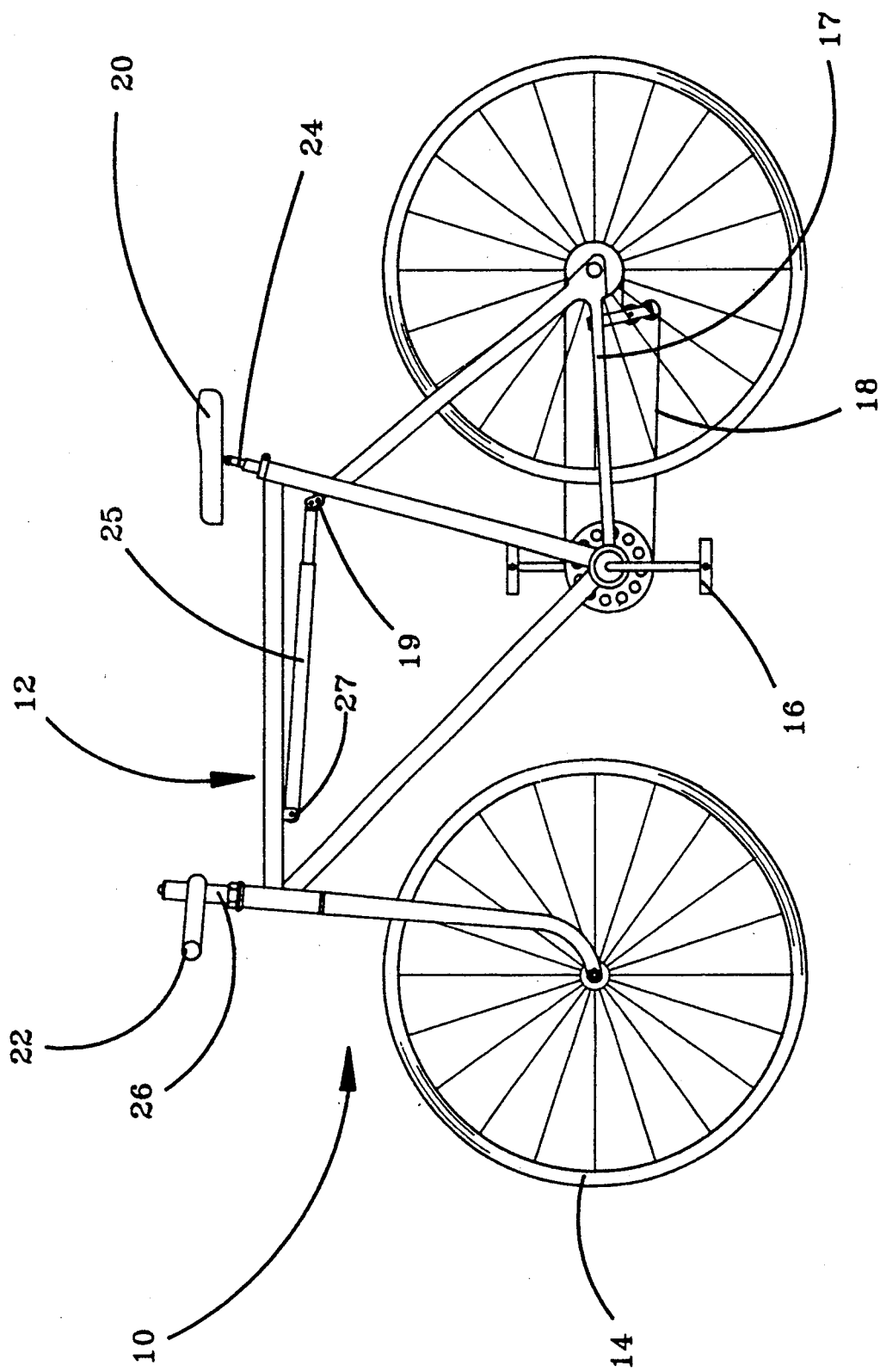
FIG. 1 is a side plan view of a bicycle incorporating the suspension system of the invention therewith.

Turning now to FIG. 1, a bicycle 10 of any conventional design includes a frame 12 having a pair of wheels 14 mounted thereon being driven by pedals 16 coupled with a chain drive 18 in the conventional manner. The bicycle 10 includes a seat 20 and handle bars 22 on which the rider will rest his or her body weight. The suspension system of the invention comprises a unique shock absorbent device unable at locations 24, 25 and 26 to cushion and isolate shocks occurring at these locations and particularly at the location of the seat 20, handle bars 22 or the rear wheel for example.

Figure 2:
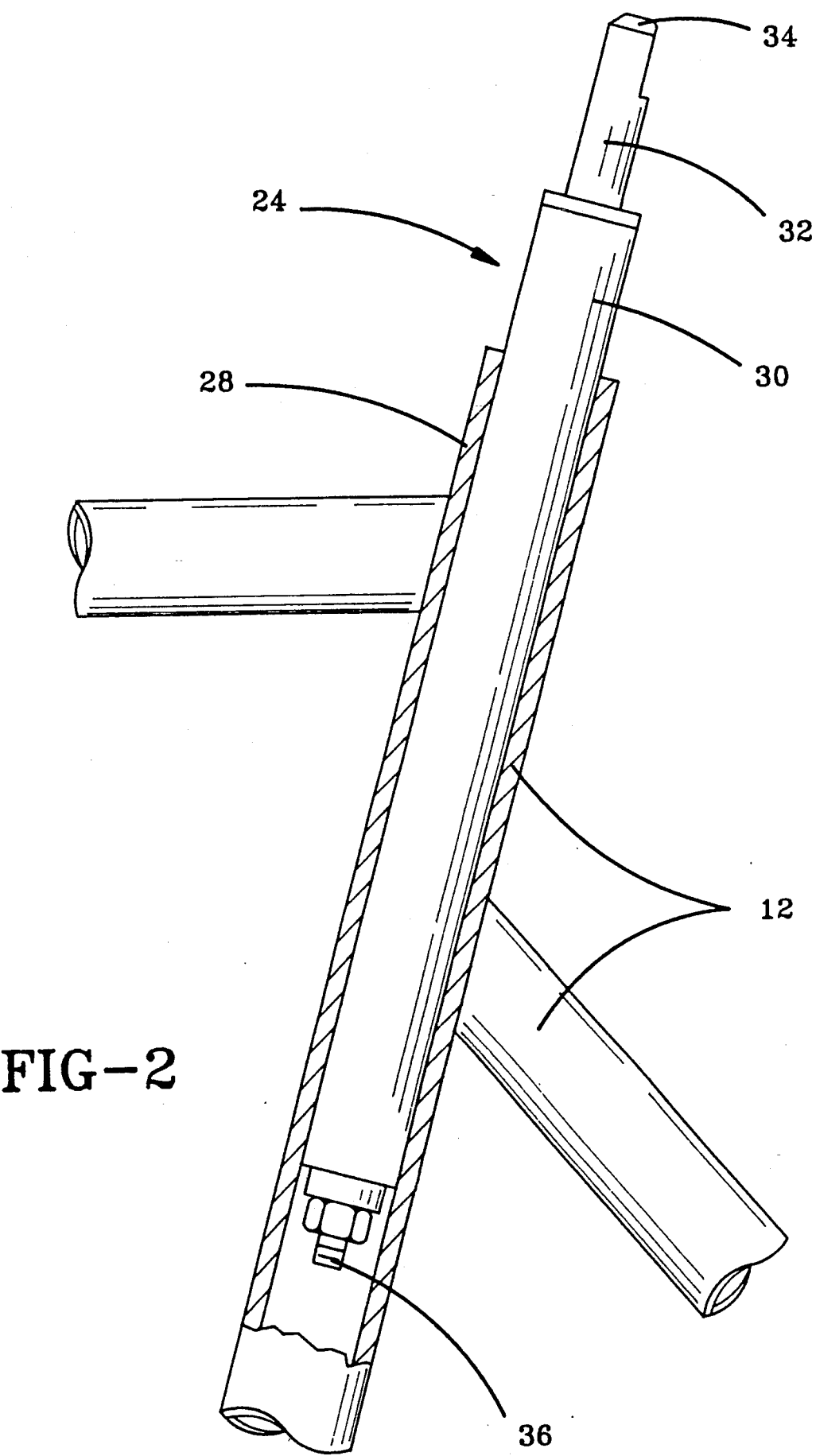
FIG. 2 is an enlarged partial cut-away view of one mounting location for the suspension device of a bicycle.

As an example seen in FIG. 2, the shock absorbing system 24 mounted at the seat location, extends into a tubular member 28 of the frame 12 and is secured thereto by means of a conventional clamping arrangement. At this location, the shock absorbing device 24 can easily replace an existing seat post so as to retrofit the device 24 into a conventional bicycle. The shock absorbing device 24 includes an outer tubing housing member 30 and a piston rod 32 disposed on the interior of the outer housing member 30 and extending outwardly therefrom to mount a seat or the like at its upper end 34. As will become apparent as the description continues, the piston rod 32 is movable relative to the outer housing member 30 to allow relative movement of the seat mounted thereon to effectively absorb shocks at this location. The outer tubular housing member 30 extends well into the tubular frame member 28 to provide sufficient rigidity and strength for support of the seat and the weight of the rider. The shock absorber 24 also includes a pre-load adjuster 36 for a variable rate spring assembly as will be more fully described hereinafter. The mounting at the handle bars of the bike as shown by shock absorbent device 26 may be similar so as to mount the handle bars to the piston rod for relative movement between the handle bars and the frame 12. Again, the device 26 may be used to replace the support post of the handle bars on a conventional bike so as to allow retrofitting of the device into a conventional bicycle. The suspension system may also be utilized in conjunction with a sub-frame 17. In this respect, the apparatus 25 may be pivotally supported on the frame 12 at 27 and coupled to sub-frame 17 through toggle link 19 to allow relative movement of the back wheel as the piston rod of the device 25 moves relative to the outer housing member of the device 25. In this application, the bicycle 10 would have to be provided with a sub-frame 17 and may be manufactured to incorporate the shock absorbing system.

Figure 3:
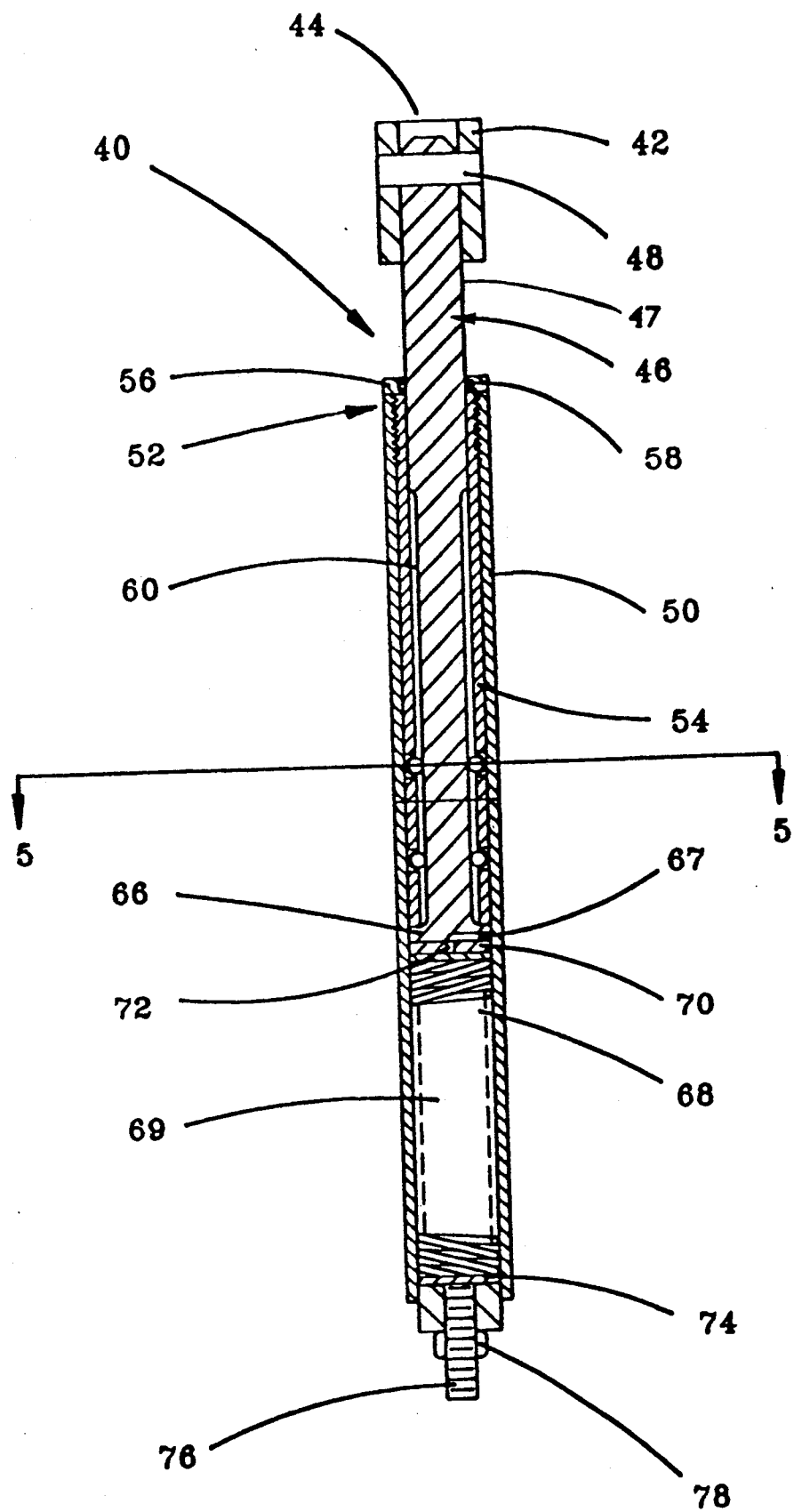
FIG. 3 is an enlarged partial cross-sectional view of a first preferred embodiment of the suspension system of the invention.

Turning now to FIG. 3 the shock isolator mounting apparatus for seat or saddles of a bicycle as well as other portions of the bike such as the handle bars is shown in more detail. The shock isolating device generally designated at 40 comprises a seat adapter 42 positioned on the outer end 44 of a piston rod 46 by means of a lock pin 48. The piston 46 comprises a piston body portion 47 which extends outwardly from an outer tubular housing member 50 having an upper open end 52. A guide cylinder or sleeve 54 may be disposed in the upper open end of the outer housing member 50 an includes a greater diameter portion 56 which supports the guide sleeve 54 within the outer housing member 50 and may be threadably secured thereto. The guide sleeve has a central aperture through which the piston body portion 47 extends into the interior of the outer housing member 50 and includes an O-ring seal 58 disposed around the piston body portion 47 to seal the structure at its upper end. The piston rod 46 includes first guide means or grooves 60 formed therein at which at least one bearing means 62 is disposed to permit telescopically slidable movement between the piston rod 46 and the tubular guide member 54. The tubular guide sleeve 54 includes second guide means which may comprise at least one aperture formed therein through which a bearing seat or insert means 64 is positioned to coact with the bearing means 62 to maintain a position of the bearing means 62 with the tubular guide member sleeve 54.

The first guide means 60 formed in the piston rod 46 has a predetermined length to permit a selective amount of travel between the piston rod 46 and the tubular guide means 54, which will be sufficient to isolate any shocks incurred during use of the bicycle or other vehicle.

At the lower end of piston rod 46 is positioned a piston plate or piston head 66 having dimensions to be slidably received in the interior of the outer tubular housing member 50 with very close tolerance. The piston head 66 is acted on by a bias spring 68 housed in the lower portion of the outer housing member 50. Interposed between the spring 68 and the piston plate 66 may be a dampening disk 70 covering the bottom portion of the piston plate 66 and having a selectively sized aperture 72 formed at the center thereof. The dampening disk is utilized for variable dampening control, wherein the aperture 72 formed therein may be of different selected sizes to permit variable dampening effects as will be hereinafter described.

Disposed within the spring chamber 69 of the outer housing member 50 is a hydraulic fluid such as oil which provides hydraulic actuation of the shock isolation device and dampening control during use. During compression of the piston rod 46 into the outer housing member 50, the hydraulic fluid in the spring chamber 69 will be made to flow through the aperture 72 formed in the dampening disk 70 and subsequently to the aperture 67 formed in the piston plate 66. In this way, hydraulic fluid may be introduced to the bearing means 62 as well as the first surfaces of the guide means 60 and second guide means or bearing seat 64 of the structure. By choosing the diameter of the aperture 72 formed in the dampening plate 70, a variable rate progressive dampening system to control piston rod compression stroke as well as rebound stroke of the piston rod is effectively controlled.

The dampening system and each compression or rebound stroke of a piston rod 46 will be directly controlled by the volume and viscosity of the hydraulic fluid disposed in the spring chamber 69 as well as the size of the aperture 72 and 67 in the dampening plate 70 and piston plate 66 respectively. It should be recognized in addition to changing the size of apertures 67 and 72 to vary the dampening characteristics, the viscosity of the hydraulic fluid could be changed by conventional means to vary the dampening characteristics. As desired, the dampening force applied during a compression stroke of the piston 46 will act to permit flow of the hydraulic fluid and thereby dampen vibrations occurring due to new shocks absorbed by the system. Alternatively, on a rebound stroke of the piston rod 46, the hydraulic fluid flow from the upper chamber housing the guide means and bearing means of the structure will be restricted to permit smooth rebound to prepare for another shock isolation.

At the lower end of the spring chamber 69 of the structure, there is provided a lower spring piston 74 acted on by a preload adjuster 76 having a preload lock nut 78. By utilizing the pre-load adjuster 76, an adjustable spring preload to vary the biasing force applied by the spring 68 is effected. It should be noted that the travel of the piston rod 46 into the outer housing member 50 is not effected by adjustment of the preload adjuster 76 and is only limited by the length of guide means 60 provided in the piston rod 46. Thus, the biasing force applied by the spring 68 may be adjusted to accommodate persons of different weight to permit effective shock isolation without limiting the effective stroke of the piston rod 46 in this structure.

It should also be recognized that the structure permits smooth telescopic slidable movement between the piston rod 46 and guide member 54 and outer housing sleeve 50. This is accomplished by supplying lubricating hydraulic fluid to the chamber above piston plate 66 of the piston rod 46 to lubricate the bearing means and guide surfaces thereof. In this way, the bearing means permits smooth slidable movement with very low friction and wear of the component parts.

Figure 4:
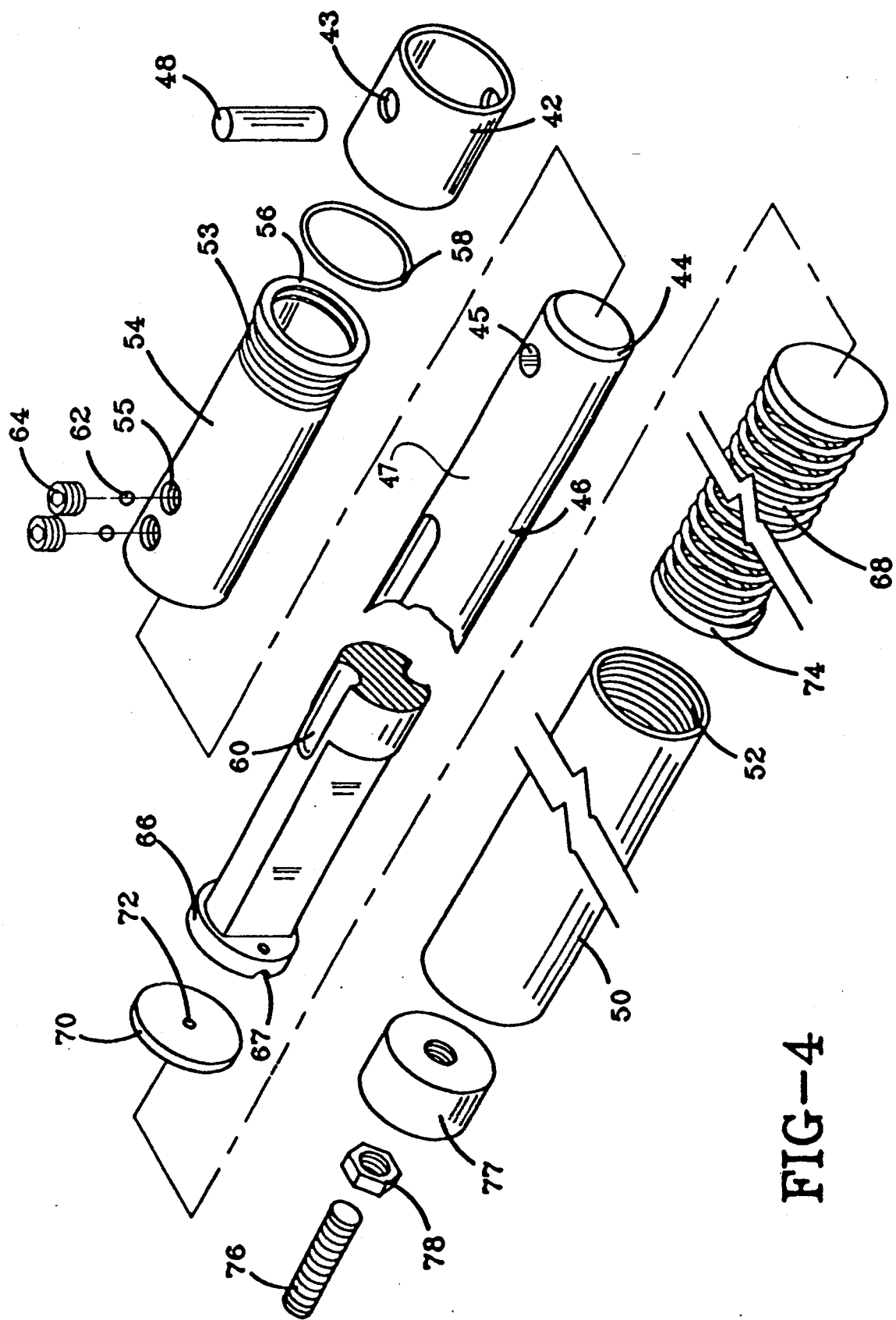
FIG. 4 is an exploded partial cross-sectional view of the suspension system as shown in FIG. 3.

As seen in FIG. 4, an exploded view of the shock isolation device 40 reveals in more detail, the structure of the individual components in the device. The outer tubular housing member 50 has at its upper end a threaded aperture 52 which coacts with threads 53 positioned on guide member 54 to firmly secure the guide member 54 thereto. The guide member 54 is seated against the top edge of the outer housing 50 and includes an o-ring seat 57 to accommodate an o-ring 58 for sealing with the piston rod 46. A piston rod 46 includes first guide means 60 formed as grooves in the piston body portion 47 which coact with a bearing means 62 which are themselves seated in bearing seats 64 inserted through apertures 55 in the guide member 54. The piston rod 46 also comprises a piston plate 66 having channel aperture 67 to permit hydraulic fluid flow from below the piston plate 66 to the guide means 60, bearing 62 and bearing seat 64. The aperture 67 also permits lubrication of the piston rod along its length to the o-ring seal to reduce friction and extend the useful life of the system. The dampening plate 70 is provided to seat against the lower edge of piston plate 66 having an aperture 72 therein which may be of variable size to permit the variable dampening characteristics of the device. The aperture 72 coacts with the channel 67 to permit flow around the piston plate 66 as is desired.

When the piston rod 46 is positioned within the outer housing member 50, a spring chamber to house spring member 68 is formed below plate 66 in which hydraulic fluid is placed. At the bottom of the outer housing member 50 is an aperture to receive preload adjusting rod 76 which searchable engages aperture 77 and extends into the interior of the outer housing member 50 to act on a spring disk 74 positioned at the lower edge of the spring 68. A sealing and locking nut 78 will prevent relative movement of the preload adjustor 76 once it is positioned to give the desired preload to the spring 68.

Figure 5:
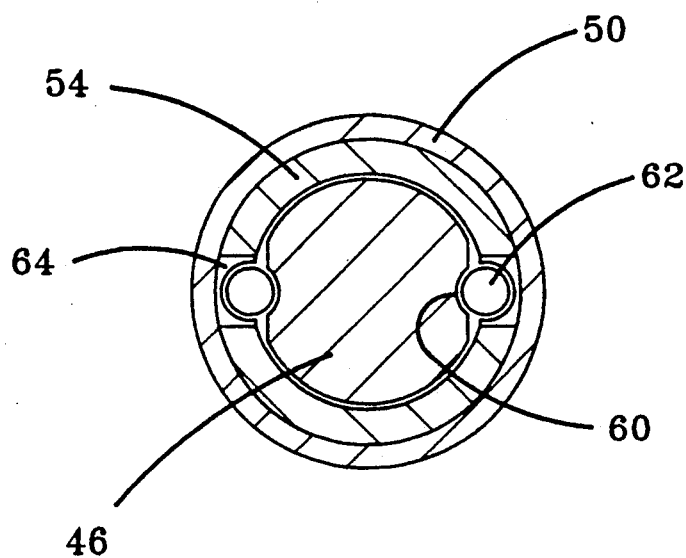
FIG. 5 shows a cross-section taken along line 5—5 of FIG. 3.

As shown in FIG. 5, the bearing means 62 may have a diameter to permit telescopic slidable motion but prevent any relative rotation between the piston rod 46 and the guide cylinder 54. As seen in this FIG., tolerances between the piston rod 46 having the guide channel 60 formed therein and association with the seat 64 act to closely confine the bearing means 62 with the dye means to prevent any relative rotation between the components.

Figure 5A:
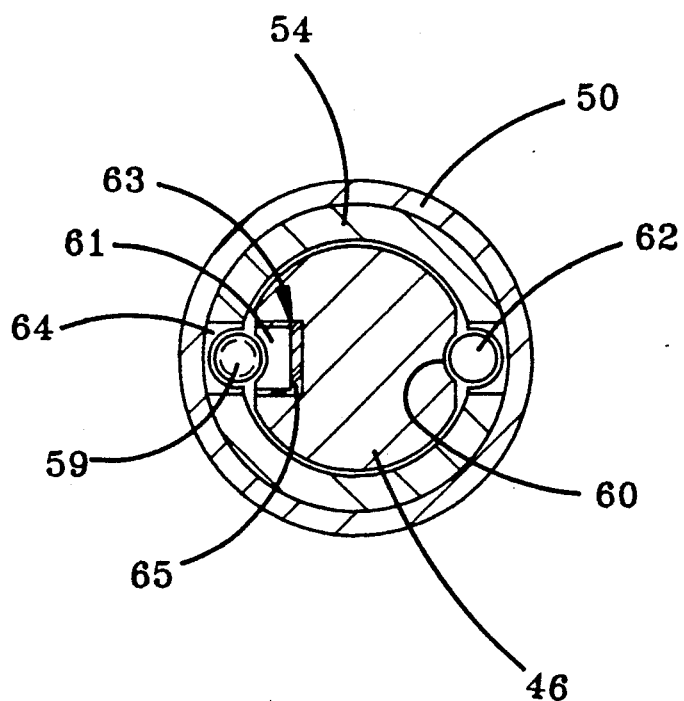
FIG. 5a shows a cross-section taken along line 5—5 of FIG. 3 and an alternate embodiment thereof.

Turning now to FIG. 5a, an alternate embodiment of the invention is shown wherein a degree of rotational movement is enabled, thereby affording a range of movement in a second directional plane relative to the movement of the piston rod in a first directional plane. In this embodiment, the limited range of movement may be accomplished by providing a bearing race insert 61 for the piston rod 46 in which the bearings 62 are positioned. A tolerance is provided under the insert 61 at 63 in which a resilient material 65 is disposed. The resilient material 65 allows limited movement of the race insert 61 and thereby the degree of rotational movement as desired. It also acts to bring the seat back to its initial aligned position automatically. Alternatively, this movement can be achieved by merely changing the diameter of the bearing means as as shown at 59 positioned in the guide means 60 and bearing seats 64. It has been found that the use of the shock isolation mounting system for the seat of a bicycle may provide additional advantages to the rider to increase comfort and flexibility of the bicycle.

During riding of the bicycle, the riders natural body movements include lateral or side-to-side movement which is translated to the mid-portion of the rider as he or she pedals. In some situations, rotational movement of the seat is not desired and the system can be designed as shown in FIG. 5 to prevent relative rotation of the piston rod 46 relative to the guide means 54 to limit movement of the system to one directional plane only. Alternatively, in other situations, the lateral movement of the rider during the pedaling action tends to create undesired forces against the rider from the seat which are desired to be avoided. By providing a limited amount of relative rotation between the piston rod 46 and the guide cylinder 54 in the structure, the seat which is mounted on the piston rod 46 is capable of a limited amount of rotational movement. By providing a range of movement in this second directional plane, the riders natural movements are compensated for in the seat to result in a more comfortable ride.

For example, the limited amount of rotational movement desired at the location of the seat to accommodate the riders natural movements during pedalling may be in a range of three degrees to ten degrees total motion, but may be adjusted for the particular rider and their body movements for the most comfortable ride. As seen in FIG. 5a, the size of the bearing 62 may simply change or the bearing seat 64 can change in association therewith to provide movement only in the guide means 60 formed in the piston rod 46. Alternative methods of providing the limited additional movement in a second directional plane will be apparent to those skilled in the art and are contemplated by the present invention.

Figure 6:
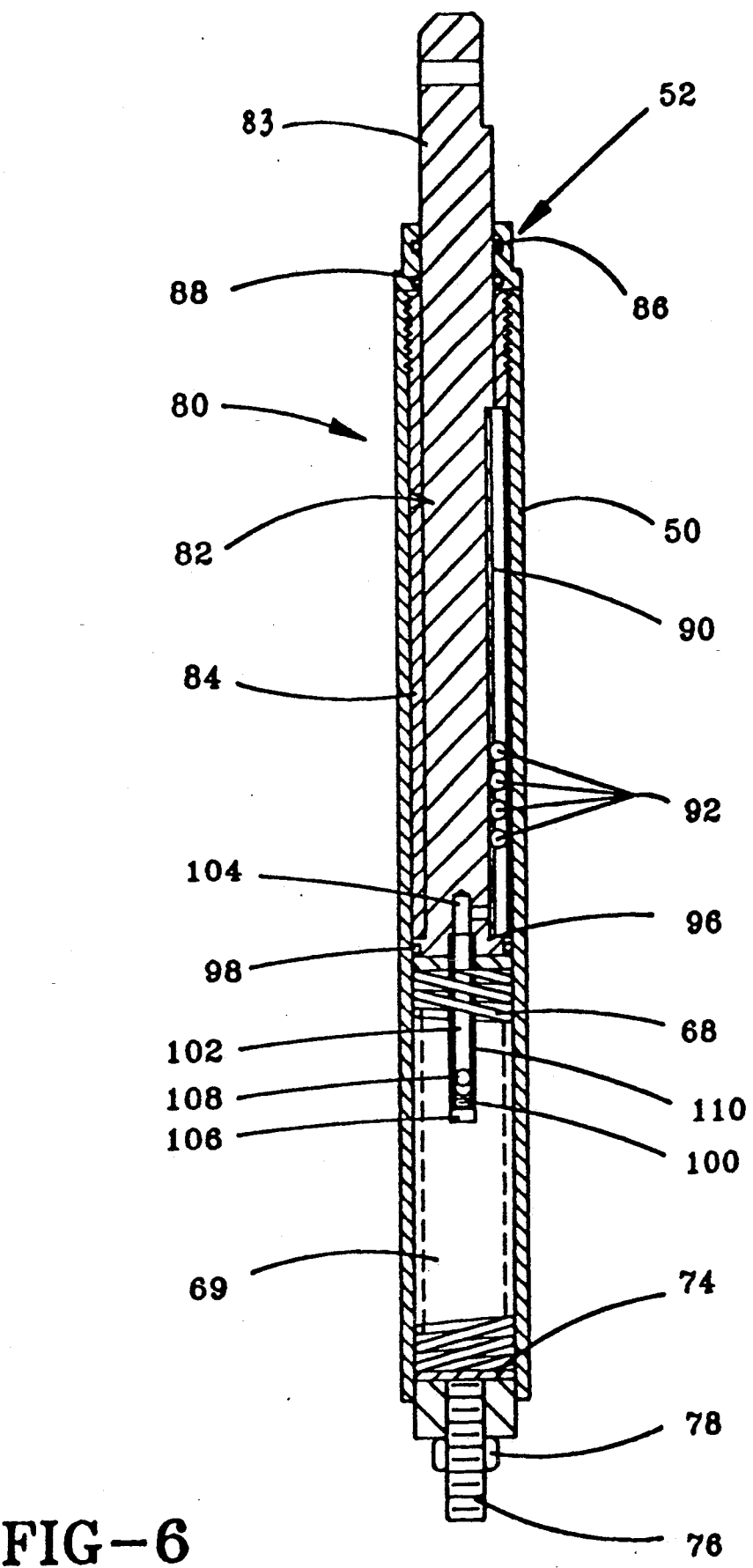
FIG. 6 is a partial cross-sectional view of an alternate embodiment of the suspension system.

Turning now to FIG. 6 an alternate embodiment 80 of the shock isolation system as shown. Many of the component parts of the system 80 are identical to those described with reference to FIGS. 3 and 4 and are indicated by like reference numerals. The shock isolating mounting apparatus 80 comprises a seat adapter 42 positioned on the outer end 44 of a piston 82 by means of a lock pin 48. The piston rod 82 includes a piston body portion 83 which extends outwardly from the interior of an outer housing member 50 at upper open end 52 thereof through a guide cylinder or sleeve 84 which is also disposed in the upper open end 52 of the housing member 50. The guide sleeve 84 may be threadably secured to the housing member 50 as previously described and includes several o-ring seats and seals as shown at 86 and 88. The guide sleeve 84 is thus sealed with the piston rod 82 and the outer housing member 50 at the upper end of the assembly. The piston rod 82, in this embodiment of the invention, includes first guide means insert 90 which may be a bearing race of hardened metal to house a plurality of bearing means 92 therein. The guide cylinder 84 also includes second guide means which may be a bearing seat or race 94 of hardened metal to permit the telescopic slidable movement between the piston rod 82 and the tubular guide sleeve 84. As with the previous embodiment of the invention, the coacting relationship between the first guide means 90 and second guide means 94 of the piston rod 82 and guide sleeve 84 respectively allow the selective amount of travel therebetween to isolate any shocks incurred. It is noted in this embodiment of the invention that similar functions may be achieved by providing guide means and bearing means on only one side of the piston rod 82 and conjunction with the guide sleeve 84, or alternatively may again be provided on diametrically opposite sides of the apparatus. The bearing races 90 and 94 allows both rotational and longitudinal movement of the bearings 92 and therefore provide very smooth and efficient operation.

At the lower end of the piston rod 82 is positioned a piston plate or head 96 having an o-ring seat and seal 98 on the exterior circumferential surface thereof to permit a tight seal with the outer housing member 50 while still enabling slidable movement therebetween. A piston plate 96 is again acted on by a spring 68 housed in the lower portion 69 of the outer housing member 50 in which hydraulic fluid may be disposed.

This embodiment of the invention also includes a different dampening system wherein a dampening valve 100 is provided to be threadably secured to the lower end of the piston rod 82 at a center portion thereof. The dampening valve 100 includes a housing having a central aperture 102 therein which will permit oil flow into an aperture 104 formed in the piston rod 82 which extends to the guide means situated above piston plate 96. The valve 100 also includes a jet nozzle insert 106 which is threadably secured into the lower end of the valve 100 and has an aperture of variable size formed therein. A check ball 108 is disposed in the aperture 102 an has dimensions to seat against the upper end of the jet 106 to effectively seal the aperture formed therein when desired.

In this way, the dampening valve 100 acts as a check valve wherein upon a compression stroke of the piston rod 82 the ball 108 will become unseated and hydraulic fluid will easily flow through the valve 100 and upwardly into the guide means to lubricate the bearing surfaces and permit a dampening action based upon the size of the aperture formed in the jet 106. During the rebound stroke, the ball 108 will seat and seal the aperture of the jet 106 such that hydraulic fluid will be made to flow through an aperture 110 formed in the housing of valve 100. As the flow through the aperture 110 is somewhat restricted, the valve 100 will permit a smooth rebounding action as desired. This system is particularly advantageous as the valve 100 extends well into the hydraulic fluid disposed in the lower spring chamber 69 to provide better dampening characteristics to the system. The other aspects of the system are identical to that previously described including the adjustable spring preload to compensate for riders having different weights and yet not limiting the effective stroke of the apparatus.

Figure 7:
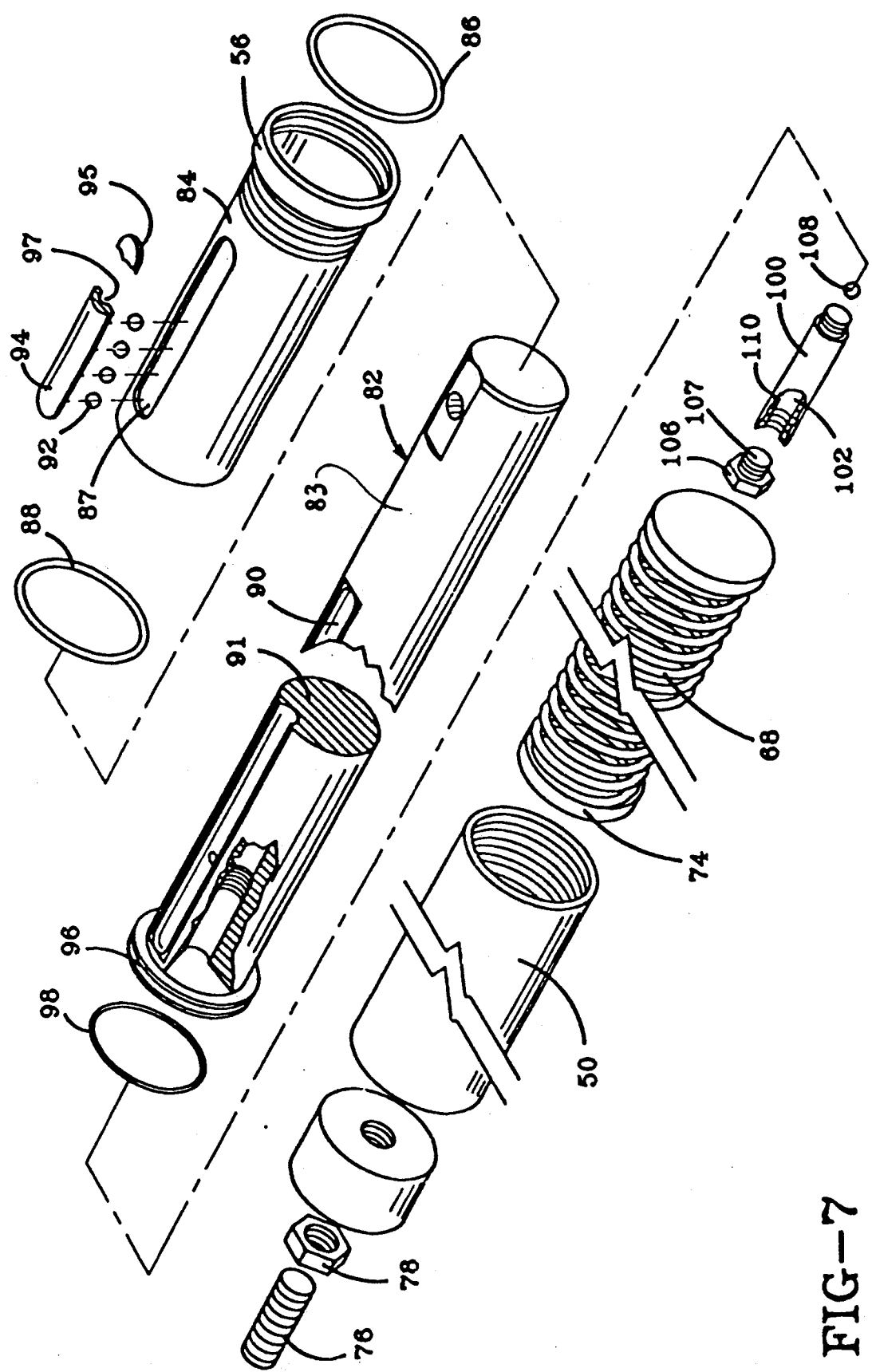
FIG. 7 is an exploded partial cross-sectional view of the alternate embodiment of the suspension system as shown in FIG. 6.

As seen in FIG. 7, the components of the shock isolation mounting device are shown in more detail. The outer tubular housing member 50 is similar to that previously described and will house spring 68 in a lower portion thereof along with a lower spring piston 74 to be acted by preloader 76 at the lower end thereof. The guide cylinder 84 having upper end 56 with o-ring seats and seals 86 and 88 is threadably connected to the upper end 52 of the outer housing member 50. The guide sleeve 84 includes an elongated aperture 87 having the ends thereof machined out to form a plurality of seats 89 in which second guide means insert having surfaces 95 coacting with surfaces 89 will seat to provide a flush outer surface to the guide sleeve 84. The bearing race inserts 94 have a curved inner surface as shown at 97 to form in conjunction with the first guide means 90 of the piston rod 82, a bearing race surface over which the bearings 92 will smoothly roll or slide. The guide means 90 of the piston rod 82 may be formed as inserts similar to bearing race inserts 94 of the guide sleeve 84 as shown at 91.

The dampening valve means 100 of this embodiment includes a housing having an aperture 102 which is threadably coupled to the base of the piston rod 82 in connected to an aperture formed in the piston rod for supplying hydraulic fluid to the guide means and bearings associated therewith. A jet-type nozzle 106 may be threadably coupled to the lower open end of the valve 100 which has an aperture 107 which may vary to restrict the flow of hydraulic fluid therethrough and adjust the dampening characteristics of the assembly. A check ball 108 will seat against the aperture 107 in the jet nozzle 106 to selectively cut off the flow through the aperture 107 such as during a rebound stroke of the piston rod 82. It should be seen that the flow of hydraulic fluid will seat or unseat the check ball 108 according to the direction of the flow, wherein when the check ball 108 is seated against the aperture 107, hydraulic fluid will be forced to flow through aperture 110 formed in the housing of valve 100 to provide proper functioning of the dampening arrangement. Limited rotational movement may be provided as previously described.

Figure 8:
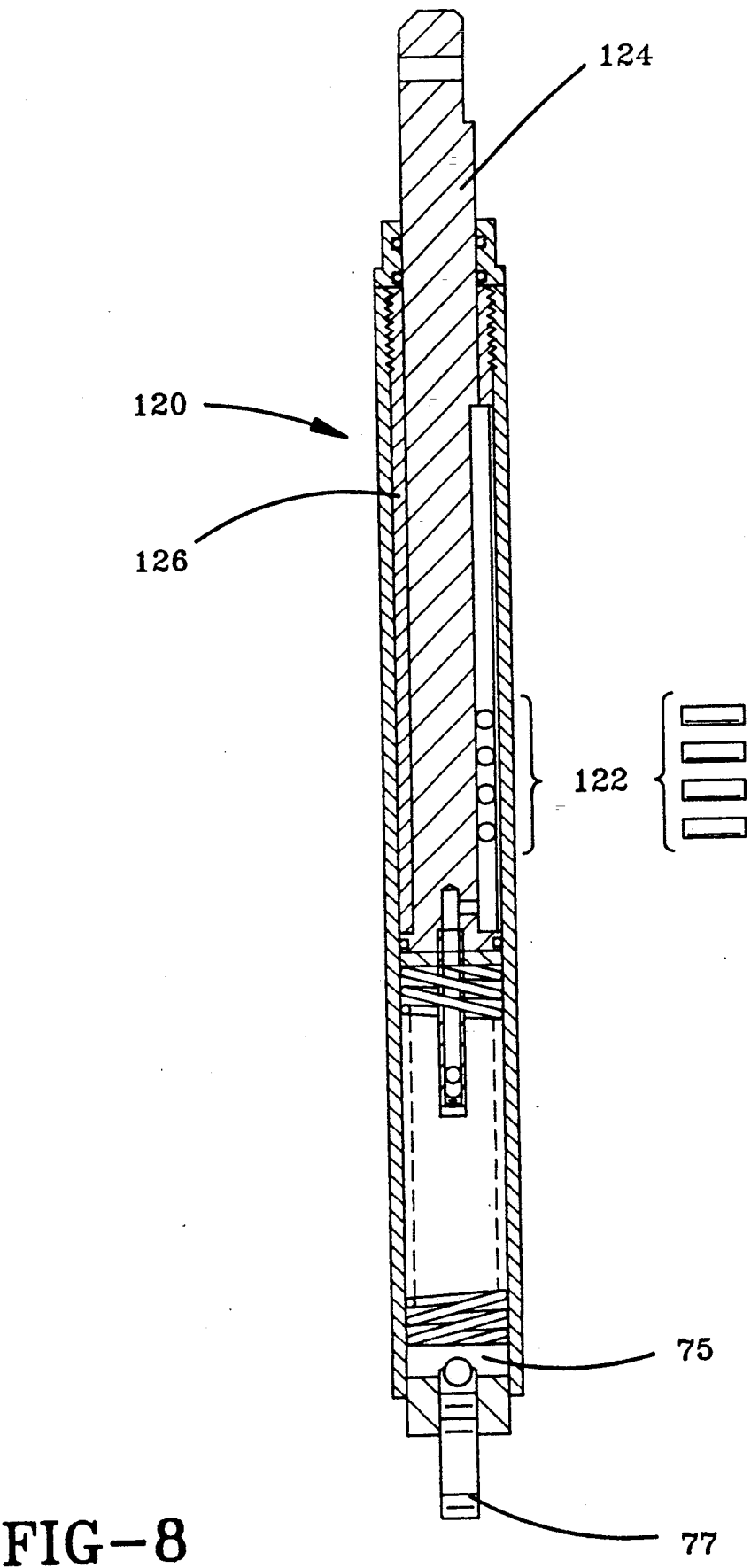
FIG. 8 is a partial cross-sectional view of an alternate embodiment of the suspension system.

Turning now to FIG. 8, another embodiment of the invention utilizes needle bearings as opposed to roller bearings to reduce machining and cost of the apparatus. The shock isolation mounting system 120 in this embodiment utilizes many of the same components which operate in a manner previously described and will not be reiterated for convenience. The system varies in that a bearing means associated with this embodiment comprises needle bearings 122 which are merely slid into guide grooves or channels formed in the piston rod 124 and guide or sleeve 126 or alternatively simply in the piston rod 124 alone. The guide grooves in this or the other embodiments of the invention, do not have to be formed by inserts and may be machined in the piston rod 124 and guide sleeve 126 themselves. The dampening and lubricating aspects of the invention may remain similar to that of the embodiments previously described, and as with the embodiment of FIGS. 3 and 4, the system may afford a non-rotation type embodiment or a limited amount of rotational movement between the piston rod 124 and guide sleeve 126 to gain the advantages mentioned.

It is also shown in this embodiment that an inert gas charge 75 may be provided for spring adjustment. An accumulator or bladder could also be provided in space 75 to accept and retain the gas charge if desired. A valve 77 may be positioned a the bottom end of the outer housing member to provide the gas charge to the system.

It is seen from the preferred embodiments of the invention as described, that the shock isolation mounting system of the invention provides a bicycle suspension system which may be incorporated or retrofit into an existing bicycle for the mounting of the seat, handle bars or the like. The system affords a compact and light weight design an enhances the comfort and versatility of the bicycle on which it is utilized. The shock isolation device provides a totally enclosed shock absorbing mechanism to prevent exposure to atmosphere conditions and also lubricates the slidable portions thereof to extend the useful and functional life of the system. The system provides a variable rate progressive dampening system to control the stroke of the device according to the speed and distance of each stroke and provides an adjustable spring preload to accommodate the riders with different weights without effecting the travel and shock absorbing characteristics of the system. The system is extremely durable as the normal side loads imposed on such a system are distributed to linear bearing guides which are strongly supported to accommodate these loads.

While the invention has been described in terms of preferred embodiments thereof, those skilled in the art will recognize that the invention may be practiced with various changes and modifications in the construction. Such variations and modifications can be made in the foregoing preferred embodiments without departing from the spirit and scope of the invention as set forth in the appended claims.

What is claimed is:

1. A shock isolation system for a bicycle or other vehicle having a main frame, the shock isolation system comprising,
   an outer housing member sealed at both ends thereof and secured to the frame of the vehicle,
   a piston having a piston head and body portion slidably disposed within said outer housing member with said body portion extending outwardly from said outer housing, said piston having first guide means formed on said body portion within said outer housing member,
   wherein said outer housing member includes second guide means associated therewith which coact with said first guide means,
   bearing means disposed within said coacting first and second guide means to allow at least relative linear movement between said piston and said outer housing member and to limit rotational movement of said piston relative to said outer housing member,
   a bias spring positioned within said outer housing member opposite said piston body portion and acting on said piston head,
   a hydraulic fluid disposed in said outer housing member,
   means to allow said hydraulic fluid to flow past said piston to provide variable dampening of the sliding movement of said piston, and to provide lubrication to the interior surfaces of said sealed outer housing member.

2. A shock isolation system as in claim 1 wherein, said outer housing member is positioned and secured at the location of a tubular support member of the frame of a bicycle having said piston means extending outwardly therefrom to act as a mounting post.

3. A shock isolation system as in claim 1, wherein said piston head seals with the inner surface of said outer housing member wherein said means to allow said hydraulic fluid to flow past said piston means comprises an aperture formed in said piston head through which said hydraulic fluid will flow.

4. A shock isolation system as in claim 3, wherein said piston head includes a dampening valve to form a variable rate progressive dampening system to control the piston means compression and rebound in relationship to the speed and distance of each compression or rebound stroke.

5. A shock isolation system as in claim 4, wherein, said dampening valve comprises a longitudinally extending housing having first and second apertures formed therein with said first aperture coupled to said aperture formed in said piston head, a jet nozzle positioned in said first aperture of said valve having a variable size aperture formed therein, and a check ball within said first aperture of said valve to selectively prevent flow of said hydraulic fluid through said jet nozzle to thereby force said hydraulic fluid out of said second aperture formed in said valve.

6. A shock isolation system as in claim 3, wherein a dampening plate is interposed between said bias spring and said piston head and has a variable size aperture formed therein which is coupled to said aperture formed in said piston head to selectively vary the flow of hydraulic fluid therethrough forming a variable rate progressive dampening system to control piston compression and rebound in relation to the speed and distance of each compression or rebound stroke of said piston.

7. A shock isolation system as in claim 1 wherein said hydraulic fluid has a preselected viscosity and volume which provides dampening characteristics in the system.

8. A shock isolation system as in claim 1 wherein, said first and second guide means comprise longitudinally extending bearing races formed as grooves to retain at least one roller bearing therein for permitting both rotational and longitudinal movement of said roller bearing therein.

9. A shock isolation system as in claim 1, wherein, said first guide means associated with said piston mans is a groove formed longitudinally in said piston means on at least one side thereof in which said bearing means are movably retained.

10. A shock isolation system as in claim 9, wherein, said first guide mans is formed as an insert to be positioned in said at least one side of said piston means.

11. A shock isolation system as in claim 10, wherein, said insert is positioned in said piston and is capable of limited movement to allow limited rotational movement of said piston.

12. A shock isolation system as in claim 11, wherein, resilient means are positioned between said insert and said piston to allow said limited movement.

13. A shock isolation system as in claim 1, wherein, said piston is capable of relative movement with said outer housing member in one directional plane only.

14. A shock isolation system as in claim 1, wherein, said piston is capable of relative movement with said outer housing member in a first directional plane along the axis of said piston means along with limited additional movement in a second directional plane perpendicular to said first directional plane.

15. A shock isolation system as in claim 14, wherein, said limited additional movement in said second directional plane is rotational movement, wherein said piston is capable of limited rotation around its axis.

16. A shock isolation system as in claim 1, wherein, a preload adjuster acts on said bias spring to adjust the bias force acting on the piston due to said bias spring, and which will not affect the travel of said piston during compression or rebound strokes thereof.

17. A shock isolation system as in claim 1, wherein, said bearing means comprises at least one roller bearing retained in said coacting first and second guide means.

18. A shock isolation system as in claim 1, wherein, said bearing means comprises at least one needle bearing disposed within a groove formed by said first guide means and said second guide means.

19. A shock isolation system as in claim 1, wherein, said outer housing member has dimensions so as to be positioned in a tubular support member of a main frame of a bicycle having said body portion of said piston extending outwardly therefrom to act as a mounting post for a seat of a vehicle.

20. A shock isolation system as in claim 1, wherein, said first and second guide means are constructed of a hardened steel to reduce wear thereon.

21. A shock isolation system as in claim 1, wherein, said bearing means are maintained in spaced apart relation within said first and second guide means to facilitate slidable motion of said piston.

22. A shock isolation system as in claim 1, wherein, said outer housing member is sealed around said piston extending outwardly therefrom to retain said hydraulic fluid in said housing and to prevent the ingress of dirt or other debris into said housing.

23. A shock isolation system as in claim 1, further including,
a guide sleeve disposed between said outer housing member and said piston having said second guide means associated therewith.

24. A shock isolation system as in claim 23, wherein, said guide sleeve includes at least one aperture formed therein and said second guide means is formed as an insert for positioning in said aperture to coact with said bearing means.

25. A shock isolation system as in claim 24, wherein said second guide means comprise a circular retaining means in which is positioned a roller bearing to retain said roller bearing therewith but permit rotation of said roller bearing during relative movement of said piston means.

26. A shock isolation system as in claim 1, wherein, the main frame of the bicycle includes a tubular frame member associated with the handlebars of the bicycle and said outer housing member is positioned in said tubular member having said body portion of said piston extending outwardly therefrom to act as a mounting post.

27. A shock isolation system for a bicycle comprising,
an outer tubular housing member positioned in and secured to a tubular frame member of a bicycle, wherein said outer tubular housing member is sealed at both ends thereof,
a piston means slidably disposed coaxially within said outer housing member and extending outwardly therefrom for mounting a portion of the bicycle said piston means, being capable of at least reciprocating linear motion relative to said outer housing member, and having a first guide means formed therein disposed within said outer tubular housing member at a first end thereof,
a guide sleeve having second guide means formed therein being positioned in said outer housing member around said piston means,
said second guide means coacting with said first guide means to house a bearing means therein to permit at least slidable motion between said piston means and said guide sleeve, wherein said first and second guide means act to limit rotational movement of said piston means,
a bias spring acting on said piston means and housed in said outer housing member adjacent a second end thereof,
a hydraulic fluid disposed in said outer housing member to provide variable dampening of the sliding movement of said piston means and to provide lubrication to the interior surfaces of sealed outer housing member.

28. A shock isolation system for a vehicle comprising,
an outer housing member having first and second ends secured to the frame of the vehicle and being sealed at both first and second ends thereof,
a piston means slidably disposed within said outer housing member having an outwardly extending post from said first end of said housing acting as a mounting post for a portion of the vehicle, wherein said piston means is formed having first guide means therein disposed within said outer housing adjacent said first end thereof,
said outer housing ember having second guide means associated therewith which act in conjunction with said first guide means to guide movement of said piston means within said outer housing member,
bearing means for facilitating slidable motion between said piston means and said outer housing member and positioned in coacting relationship with said first and second guide means,
a bias spring acting on said piston means in said outer housing member,
hydraulic fluid disposed in said outer housing member to provide lubrication to the outer housing member and portions of the shock isolation system disposed therein.

* * * * *